United States Patent
Lai

(10) Patent No.: US 7,841,758 B2
(45) Date of Patent: Nov. 30, 2010

(54) ILLUMINATING DEVICE

(75) Inventor: Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 187 days.

(21) Appl. No.: 12/198,305

(22) Filed: Aug. 26, 2008

(65) Prior Publication Data
US 2009/0213618 A1 Aug. 27, 2009

(30) Foreign Application Priority Data
Feb. 22, 2008 (CN) .................. 2008 1 0300388

(51) Int. Cl.
*F21V 7/04* (2006.01)
(52) U.S. Cl. ..................... 362/606; 362/607
(58) Field of Classification Search ............. 362/606, 362/607, 612
See application file for complete search history.

(56) References Cited

U.S. PATENT DOCUMENTS

| | | | |
|---|---|---|---|
| 5,998,925 A | 12/1999 | Shimizu et al. | |
| 6,871,972 B2 * | 3/2005 | Ju | 362/603 |
| 7,014,351 B2 * | 3/2006 | Leu et al. | 362/625 |
| 7,306,357 B2 * | 12/2007 | Han et al. | 362/610 |
| 2007/0086184 A1 | 4/2007 | Pugh et al. | |

FOREIGN PATENT DOCUMENTS

| | | | |
|---|---|---|---|
| JP | 2003100126 A | * | 4/2003 |
| JP | 2006073202 A | * | 3/2006 |

OTHER PUBLICATIONS

Shur et al., Solid-State Lighting: Toward Superior Illumination, Proceedings of the IEEE, vol. 93, No. 10, Oct. 2005, pp. 1691-1703.

* cited by examiner

*Primary Examiner*—David V Bruce
(74) *Attorney, Agent, or Firm*—Andrew C. Cheng

(57) ABSTRACT

An illuminating device (90a) includes a plurality of LEDs (91) and a light guiding plate (93a). The light guiding plate includes a light incident surface (931) and a light output surface (932). A fluorescent material (938) is distributed in an inside of the light guiding plate. The LEDs are used to emit first light of a first wavelength to excite the fluorescent material thereby producing second light of a second wavelength. The LEDs and the fluorescent material are arranged in a manner that the combined first and second light emitted from the light output surface appears to be white light.

9 Claims, 11 Drawing Sheets

ILLUMINATING DEVICE

CROSS-REFERENCE TO RELATED APPLICATION

This application is related to a co-pending application entitled a same title with the present application, assigned to the same assignee of this application and filed on the same date. The disclosure of the co-pending application is wholly incorporated herein by reference.

BACKGROUND

1. Technical Field

The present invention generally relates to illuminating devices, and particularly to an illuminating device incorporating light emitting diodes (LEDs) used for reducing glare generated by the illuminating device.

2. Description of Related Art

With the continuing development of scientific technology, LEDs have been widely used in illumination devices to substitute for conventional cold cathode fluorescent lamps (CCFL) due to their high brightness, long lifespan, and wide color gamut. Relevant subject matter is disclosed in an article entitled "Solid State Lighting: Toward Superior Illumination", published in a magazine Proceedings of the IEEE, Vol. 93, No. 10, by Michael S. Shur et al. in October, 2005, the disclosure of which is incorporated herein by reference.

However, glare generated by the illuminating devices is an intense and blinding light, which is harmful to people's eyes.

Therefore, what is needed is a new illuminating device, which can reduce the glare generated by the illuminating device.

SUMMARY

The present invention relates to an illuminating device. According to an exemplary embodiment, the illuminating device includes a plurality of LEDs and a light guiding plate. The light guiding plate includes a light incident surface and a light output surface. A fluorescent material is distributed in an inside of the light guiding plate. The LEDs are used to emit first light of a first wavelength to excite the fluorescent material thereby producing second light of a second wavelength. The LEDs and the fluorescent material are arranged in a manner that the combined first and second light emitted from the light output surface appears to be white light.

Other advantages and novel features of the present invention will become more apparent from the following detailed description when taken in conjunction with the accompanying drawings.

BRIEF DESCRIPTION OF THE DRAWINGS

Many aspects of the present illuminating device can be better understood with reference to the following drawings. The components in the drawings are not necessarily drawn to scale, the emphasis instead being placed upon clearly illustrating the principles of the present illuminating device. Moreover, in the drawings, like reference numerals designate corresponding parts throughout the several views.

DETAILED DESCRIPTION

Figure 1:
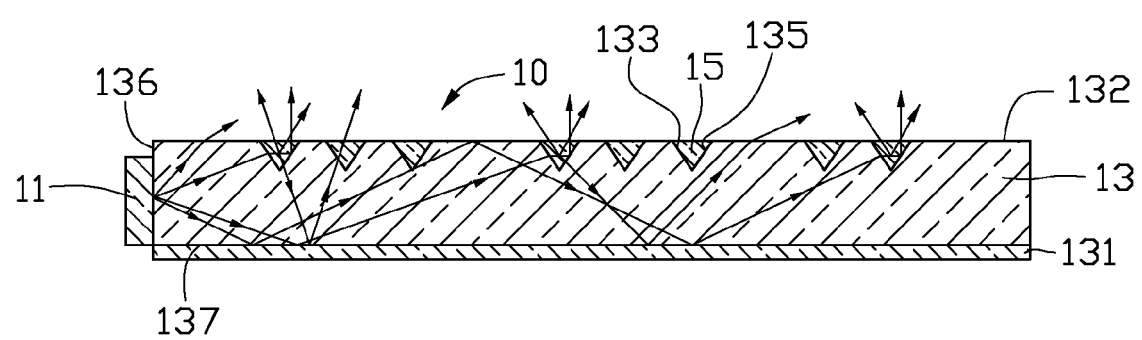
FIG. 1 is a schematic, cross-sectional view of an illuminating device in accordance with a first embodiment of the present invention.

Referring to FIG. 1, an illuminating device 10 in accordance with a first embodiment of the present invention includes a light emitting component, a light guiding plate 13 and a fluorescent material 15. In the present embodiment, the light emitting component is an LED 11.

The LED 11 is disposed at a lateral side of the light guiding plate 13, for serving as a primary light source.

The plate 13 is made of transparent materials, such as silicone, resin, glass, polymethyl methacrylate (PMMA), quartz, polycarbonate (PC), epoxy, polyacrylate and so on. The plate 13 has light transparency of 70% and refractive index of 1.4-1.7. The plate 13 has a rectangular shape. The plate 13 includes a light incident surface 136, a light output surface 132 and a bottom surface 137 opposite to the light output surface 132. The light incident surface 136 faces toward the LED 11. A light reflective layer 131 is evenly disposed on the bottom surface 137, so as to reflect the light emitted from the LED 11 toward the light output surface 132. It should be understood that the light reflective layer 131 can be disposed on both of the bottom surface 137 and a lateral side surface opposite to the light incident surface 136.

The plate 13 defines a plurality of tiny recesses 133 in the light output surface 132 thereof. The recesses 133 are spaced from each other and evenly defined in the light output surface 132. Each recess 133 has a strip shape from a front end toward a rear end. A width of each recess 133 at a topmost end thereof is less than 5 mm. Each recess 133 includes two slanted sidewalls 135 (only one sidewall is labeled) opposite to each other. Each sidewall 135 is a planar surface. It should be understood that the sidewall 135 can be a curved surface, such as a paraboloid and so on. The recesses 133 can coarsen the slippery light output surface 132 of the plate 13, thereby preventing total reflection of light at the light output surface 132. Thus, the light can easily enter the light output surface 132, and exit out of the plate 13. In addition, the recesses 133 can minimize an incident angle of the light with respect to the light output surface 132, which enables the light to form an irregular reflection at the light output surface 132. Accordingly, the light is emitted out of the light output surface 132 along different directions thus it is evenly distributed. It should be understood that the sidewalls 135 of the recesses 133 can be rough, thereby further enables the light to form an irregular reflection at the light output surface 132.

The recesses 132 in the light output surface 132 can be made by micro electro mechanical system (MEMS), injection molding, micro electroforming, lithography, etching and so on.

The fluorescent material 15 can be made of sulfide, aluminate, oxide, silicate or nitride, such as $Ca_2Al_{12}O_{19}:Mn$, $(Ca, Sr, Ba)Al_2O_4:Eu$, $Y_3Al_5O_{12}:Ce^{3+}(YAG)$, $Tb_3Al_5O_{12}:Ce^{3+}$ (TAG), $BaMgAl_{10}O_{17}:Eu^{2+}(Mn^{2+})$, $Ca_2Si_5N_8:Eu^{2+}$, $(Mg, Ca, Sr, Ba)_2SiO_4:Eu^{2+}$, $(Mg, Ca, Sr, Ba)_3Si_2O_7:Eu^{2+}$, $Ca_8Mg(SiO_4)_4Cl_2:Eu^{2+}$, $Y_2O_2S:Eu^{3+}$, $(Sr, Ca, Ba)Si_xO_yN_z:Eu^{2+}$, $(Ca, Mg, Y)SiwAl_xO_yN_z:Eu^{2+}$, CdS and so on.

The fluorescent material 15 is received in the recesses 133 in the light output surface 132, for serving as a secondary light source. A combination of the fluorescent material 15 and the LED 11 is selected from a group consisting of yellow fluorescent material and blue LED; red and green fluorescent material and blue LED; red, green and blue fluorescent material and ultraviolet LED. The fluorescent material 15 is excited by a part of the light emitted from the LED 11 and emits divergent light along different directions. The light from the fluorescent material 15 is mixed together with the other part of the light emitted from the LED 11 to generate white light.

Before being received in the recesses 135, the fluorescent material 15 is mixed together with a liquid-state colloid, such as resin, epoxy, silicone and so on. The mixed fluorescent material 15 is filled into the recesses 135, and then solidified via heating or ultraviolet. The fluorescent material 15 mixed together with the colloid can prevent the fluorescent material 15 from contacting with outside atmosphere as possible as it can. Thus, the fluorescent material 15 is isolated from the outside atmosphere and can not metamorphose due to contact with the outside atmosphere.

When the illuminating device 10 operates, the light emitted from the LED 11 enters into the plate 13 through the light incident surface 136. A part of the light entering into the plate 13 directly emits toward the light output surface 132 of the plate 13. The other part of the light entering into the plate 13 emits toward the bottom surface 137, and is reflected by the light reflective layer 131. The light reflected by the light reflective layer 131 changes its original direction, and emits toward the light output surface 132 of the plate 13. A part of the light arrived at the light output surface 132 exits the plate 13 at a non-recess position of the light output surface 132. Another part of the light arrived at the light output surface 132 is refracted through the slanted sidewalls 135 of the recesses 133, and emits toward the fluorescent material 15 in the recesses 133. The fluorescent material 15 is accordingly excited by the light and emits divergent light which exits the plate 13 along different directions. The other part of the light arrived at the light output surface 132 is further reflected by the light output surface 132 and the light reflective layer 131, and finally emits toward the fluorescent material 15 in the recesses 133. The fluorescent material 15 is accordingly excited and emits divergent light which exits the plate 13 along different directions.

In the illuminating device 10, the LED 11 is disposed adjacent to the light incident surface 136 of the plate 13, and the fluorescent material 15 is received in the recesses 133 of the plate 13. Namely, the LED 11 is in a distance away from the fluorescent material 15, which can prevent the fluorescent material 15 from overheating. Accordingly, the lifespan and the performance of the illuminating device 10 can be improved. In addition, the recesses 133 of the plate 13 can prevent total reflection of light at the light output surface 132 as possible as it can, thereby improving the utilization rate of the light. Furthermore, the fluorescent material 15 is received in the recesses 133 in the light output surface 132, whereby the fluorescent material 15 is excited by the light and emits divergent light exiting the plate 13 along different directions. Accordingly, the light can evenly distribute on the light output surface 132, which can reduce glare, thus making the light feel more comfortable to the user's eyes.

Moreover, the fluorescent material 15 is excited by a part of the light emitted from the LED 11 to emit light. The light emitted from the fluorescent material 15 has a different wavelength from the light emitted from the LED 11. The light emitted from the fluorescent material 15 mixes together with the other part of the light emitted from the LED 11 to generate white light at the light output surface 132. The white light is favorable to be used in illumination field. Specially, the wavelength of the light emitted from the fluorescent material 15 is greater than that of the light emitted from the LED 11.

Figure 2:
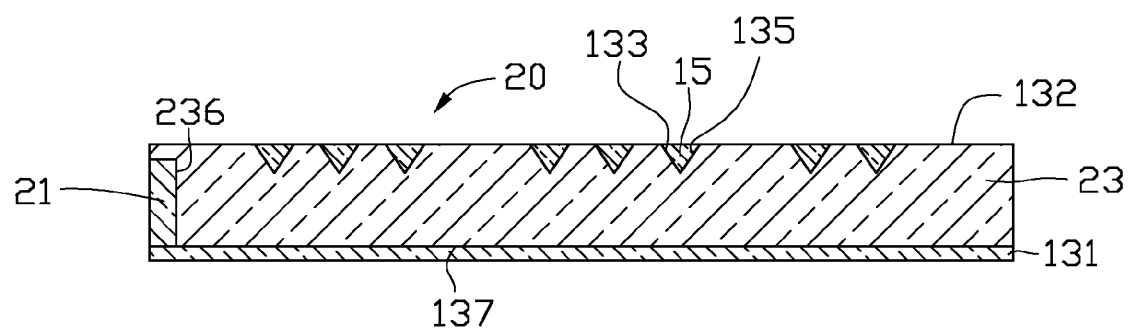
FIG. 2 is a schematic, cross-sectional view of an illuminating device in accordance with a second embodiment of the present invention.

It should be understood that the LED 11 is not limited to the above-described location. Referring to FIG. 2, in the illuminating device 20 of the second embodiment, the LED 21 is received in the plate 23. The LED 21 is embedded in a lateral side of the plate 23, and is in a distance away from the fluorescent material 15. The light incident surface 236 is formed at a position of the plate 13 facing toward the LED 21.

It should be understood that the recesses 133 in the illuminating device 10, 20 can also have other arrangements and configurations, as shown in the following embodiments.

Figure 3:
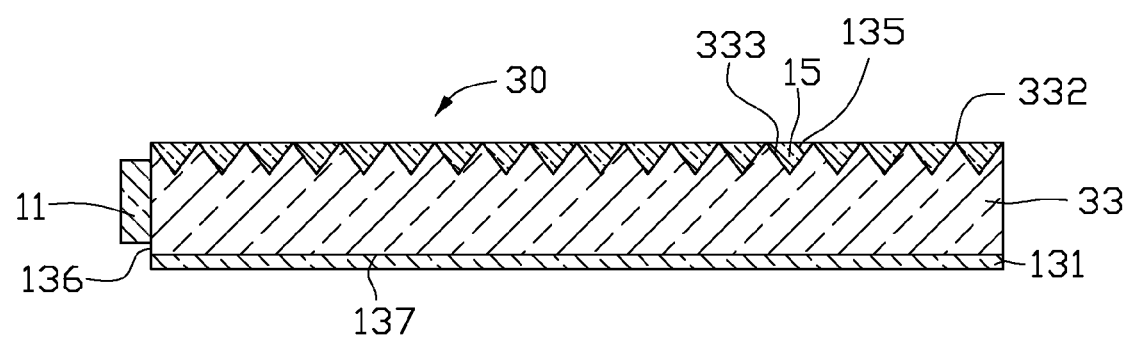
FIG. 3 is a schematic, cross-sectional view of an illuminating device in accordance with a third embodiment of the present invention.

Referring to FIG. 3, an illuminating device 30 in accordance with a third embodiment of the present invention is shown. The illuminating device 30 is similar to the illuminating device 10 in the first embodiment. In the present embodiment, the recesses 333 in the light output surface 332 of the plate 33 are contiguous with each other. A transmitting manner of the light in the illuminating device 30 is similar to that in the illuminating device 10.

Figure 4:
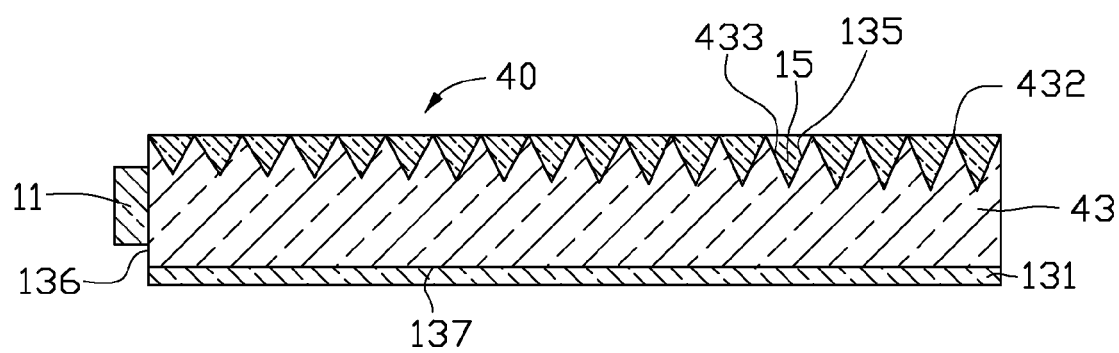
FIG. 4 is a schematic, cross-sectional view of an illuminating device in accordance with a forth embodiment of the present invention.

Referring to FIG. 4, an illuminating device 40 in accordance with a forth embodiment of the present invention is shown. The illuminating device 40 is similar to the illuminating device 30 in the third embodiment. In the present embodiment, the recesses 433 in the light output surface 432 of the plate 43 have a depth gradually increasing in a direction away from the LED 11. An incident angle of the light emitted toward the recess 433 remote from the LED 11 is greater than that the light emitted toward the recess 433 adjacent to the LED 11, so that the light emitted toward the recess 433 remote from the LED 11 can generate total reflection easily. The recesses 433 having increased depth can prevent the light from generating total reflection. A transmitting manner of the light in the illuminating device 40 is similar to that in the illuminating device 10.

Figure 5:
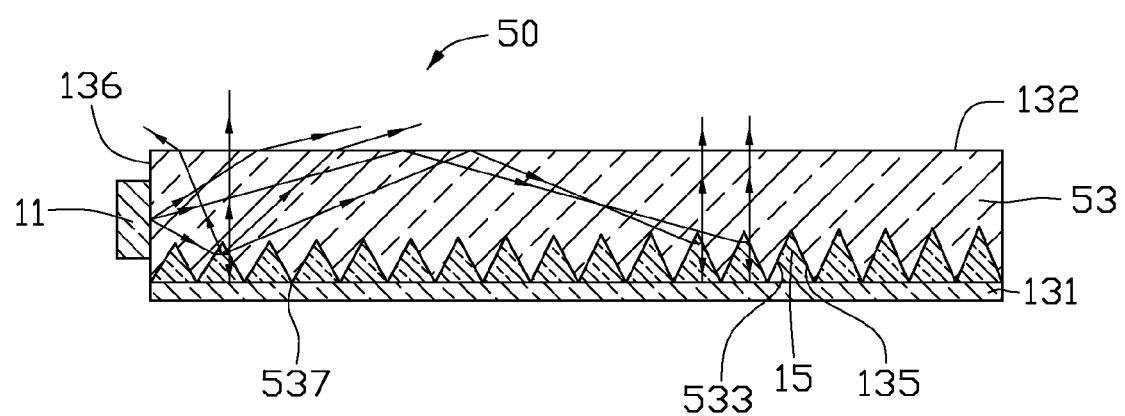
FIG. 5 is a schematic, cross-sectional view of an illuminating device in accordance with a fifth embodiment of the present invention.

Referring to FIG. 5, an illuminating device 50 in accordance with a fifth embodiment of the present invention is shown. The illuminating device 50 is similar to the illuminating device 40 in the forth embodiment. In the present embodiment, the recesses 533 are defined in the bottom surface 537 of the plate 53.

During operation, the light emitted from the LED 11 enters into the plate 53 through the light incident surface 136. A part of the light entering into the plate 53 directly emits toward the light output surface 132 of the plate 53. The other part of the light entering into the plate 53 directly emits toward the bottom surface 537 of the plate 53, or is reflected by the light output surface 132 and emits toward the bottom surface 537.

The light arrived at the bottom surface 537 is refracted through the slanted sidewalls 135 of the recesses 533, and emits toward the fluorescent material 15 in the recesses 533. The fluorescent material 15 is accordingly excited by the light and emits divergent light along different directions. A part of the light emitted from the fluorescent material 15 directly emits toward the light output surface 132 of the plate 53. The other part of the light emitted from the fluorescent material 15 is reflected by the light reflective layer 131, and emits toward the light output surface 132 of the plate 53.

A part of the light arrived at the light output surface 132 directly exits the plate 53 through the light output surface 132. The other part of the light arrived at the light output surface 132 is reflected by the light output surface 132, and emits toward the recesses 533 on the bottom surface 537. The fluorescent material 15 in the recesses 533 is accordingly excited by the light and emits divergent light along different directions. As a result, the light emitted from the fluorescent material 15 exits the plate 15 along different directions at the light output surface 132 after further reflection by the light output surface 132 or/and the light reflective layer 131.

Figure 6:
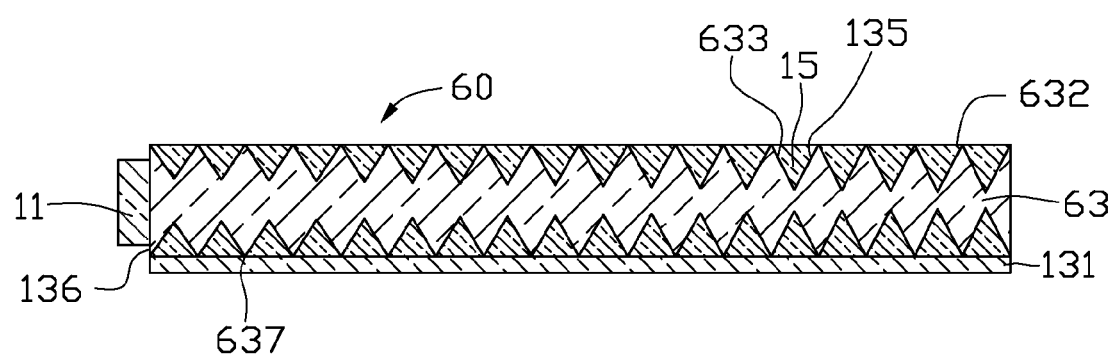
FIG. 6 is a schematic, cross-sectional view of an illuminating device in accordance with a sixth embodiment of the present invention.

Referring to FIG. 6, an illuminating device 60 in accordance with a sixth embodiment of the present invention is shown. The illuminating device 60 is similar to the illuminating devices 40, 50 in the forth and fifth embodiment. In the present embodiment, the recesses 633 are defined in both of the light output surface 632 and the bottom surface 637 of the plate 63. A transmitting manner of the light in the illuminating device 60 is similar to that in the illuminating device 10, 50.

It should be understood that the fluorescent material 15 in the illuminating device 10, 20, 30, 40, 50, 60 can also have other arrangements, as shown in the following embodiments.

Figure 7:
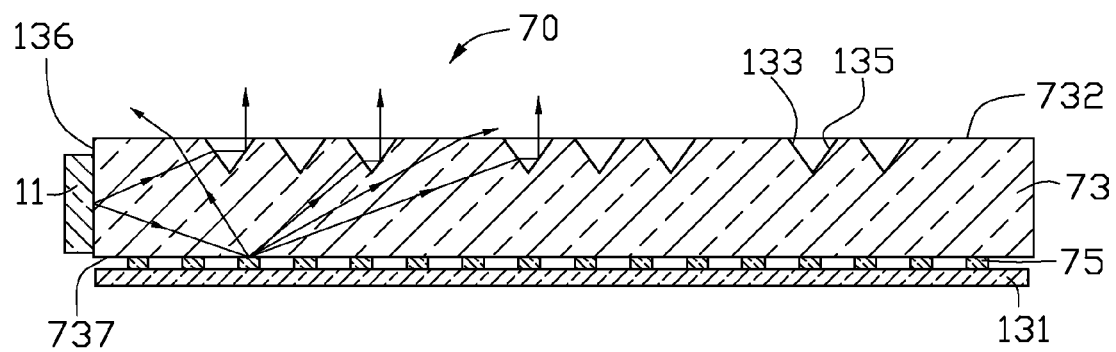
FIG. 7 is a schematic, cross-sectional view of an illuminating device in accordance with a seventh embodiment of the present invention.

Referring to FIG. 7, an illuminating device 70 in accordance with a seventh embodiment of the present invention is shown. The illuminating device 70 is similar to the illuminating device 10 in the first embodiment. In the present embodiment, the fluorescent material 75 is evenly distributed on the bottom surface 737 of the plate 73 and spaced from each other. In other words, the fluorescent material 75 is sandwiched between the bottom surface 737 and the light reflective layer 131 of the plate 73. The fluorescent material 75 is formed on the bottom surface 737 via imprint techniques and so on.

The light emitted from the LED 11 emits toward the fluorescent material 75 on the bottom surface 737, and activates the fluorescent material 75 to emit divergent light along different directions. The light emitted form the fluorescent material 75 emits toward the light output surface 732, and exits the plate 73 after refraction through the recesses 133.

Figure 8:
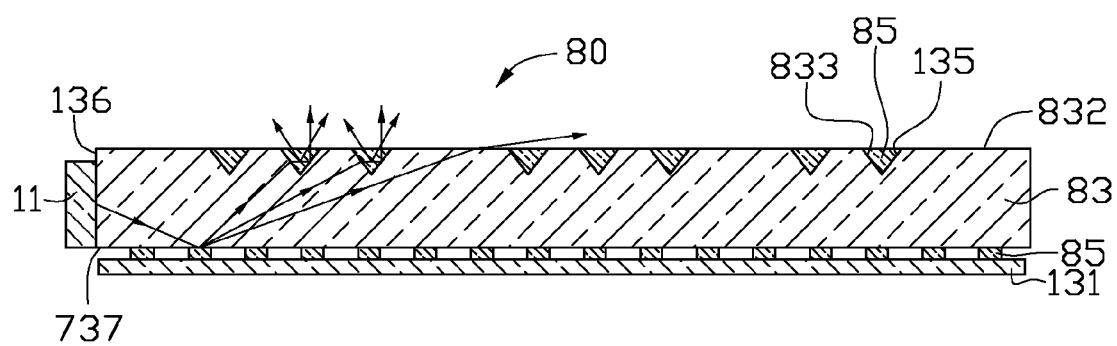
FIG. 8 is a schematic, cross-sectional view of an illuminating device in accordance with a eighth embodiment of the present invention.

Referring to FIG. 8, an illuminating device 80 in accordance with an eighth embodiment of the present invention is shown. The illuminating device 80 is similar to the illuminating device 70 in the seventh embodiment. In the present embodiment, the fluorescent material 85 is further discretely received in the recesses 833 in the light output surface 832 of the plate 83.

Figure 9:
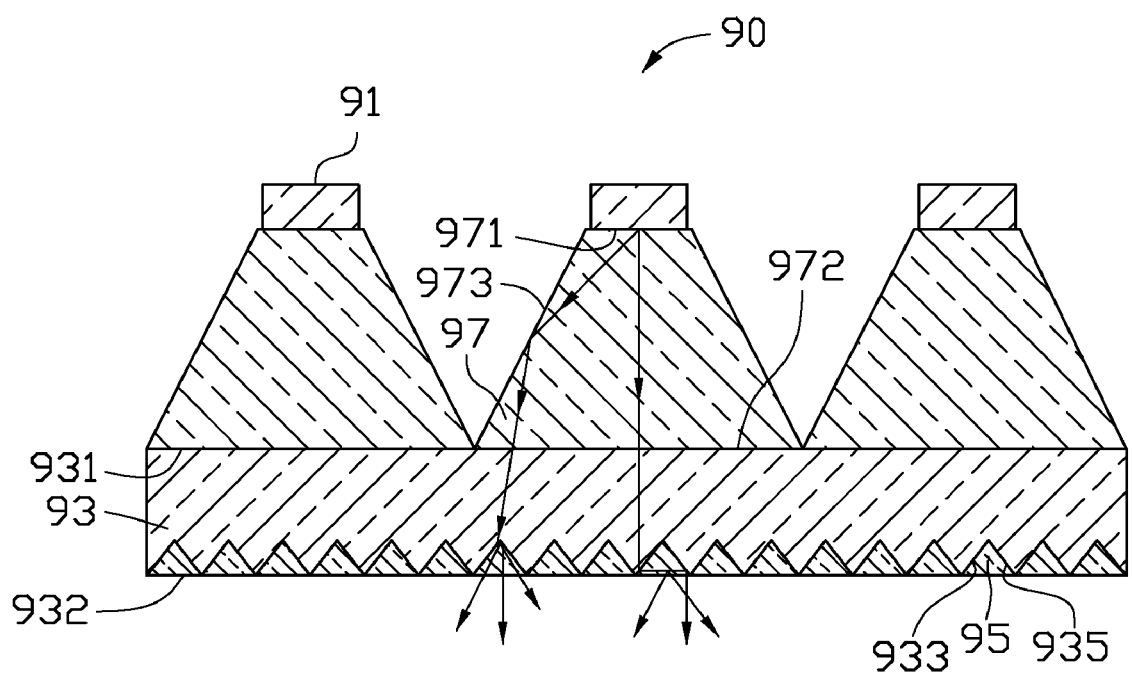
FIG. 9 is a schematic, cross-sectional view of an illuminating device in accordance with a ninth embodiment of the present invention.

Referring to FIG. 9, an illuminating device 90 in accordance with a ninth embodiment of the present invention is shown. In the present embodiment, the illuminating device 90 includes a light guiding plate 93, a plurality of LEDs 91 and a plurality of light coupling portions 97.

The plate 93 includes a light incident surface 931 at a top end thereof and a light output surface 932 opposite to the light incident surface 931. The plate 93 defines a plurality of tiny recesses 933 in the light output surface 932 thereof. The recesses 933 are contiguous with each other and evenly defined in the light output surface 932. A fluorescent material 95 is received in the recesses 933. The materials made of the fluorescent material 95 is the same as that made of the fluorescent material 15 in the first embodiment. The fluorescent material 95 is excited by a part of the light emitted from the LEDs 91 and emits divergent light along different directions. The light from the fluorescent material 95 is mixed together with the other part of the light emitted from the LEDs 91 to generate a white light.

The light coupling portions 97 have one-to-one corresponding relationships with respect to the LEDs 91. Each light coupling portion 97 has a truncated conical shape, and tapers from a bottom end to a top end thereof. Each light coupling portion 97 includes a light incident coupling surface 971 at the top end thereof, a light output coupling surface 972 at the bottom end thereof, and a slanted light reflective surface 973 interconnecting with the incident coupling surface 971 and the output coupling surface 972. The incident coupling surface 971 is disposed adjacent to the corresponding LED 91. The output coupling surface 972 faces toward the light incident surface 931 of the plate 93. The light coupling portions 97 are made of transparent materials, such as silicone, resin and so on. The light coupling portions 97 has light transparency of 70% and refractive index of 1.4-1.7.

During operation, the light emitted from the LED 91 enters into the corresponding light coupling portion 97 through the incident coupling surface 971. A part of the light entering into the light coupling portion 97 directly exits the light coupling portion 97 through the output coupling surface 972. The other part of the light entering into the light coupling portion 97 is total reflected by the light reflective surface 973, changing its original direction, and exits the light coupling portion 97 through the output coupling surface 972. The light exiting the light coupling portion 97 enters into the plate 93 through the incident coupling surface 931. The light entering into plate 93 emits toward the light output surface 932. The light arrived at the light output surface 932 is refracted through the slanted sidewalls 935 of the recesses 933, and emits toward the fluorescent material 95 in the recesses 933. The fluorescent material 95 is accordingly excited by the light and emits divergent light exiting the plate 93 along different directions.

Figure 10:
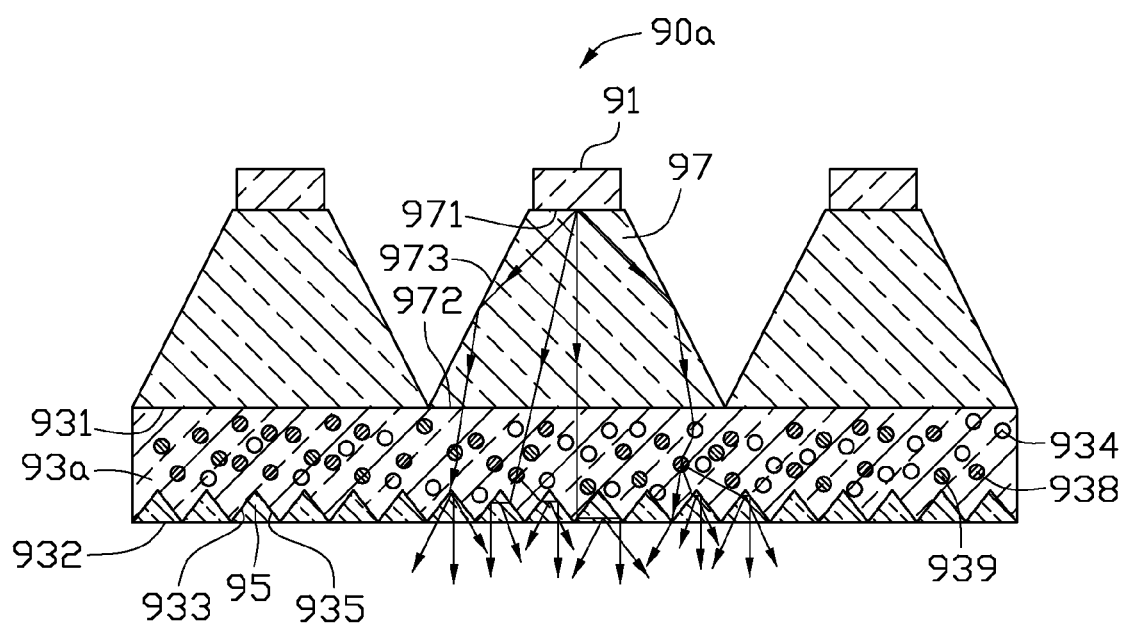
FIG. 10 is a schematic, cross-sectional view of an illuminating device in accordance with a tenth embodiment of the present invention.

Referring to FIG. 10, an illuminating device 90a in accordance with a tenth embodiment of the present invention is shown. The illuminating device 90a is similar to the illuminating device 90 in the ninth embodiment. In the present embodiment, the plate 93a includes a plurality of cavities 934, a fluorescent material 938 and a dielectric material 939.

The cavities 934 are irregularly distributed in an inside of the plate 93a from the incident coupling surface 931 to the light output surface 932. The plate 93a is irradiated by electromagnetic wave having high energy density. As a result, an inner structure of the plate 92a is destroyed, so as to form the cavities 934.

The fluorescent material 938 and the dielectric material 939 are irregularly distributed in the inside of the plate 93a. The material made of the fluorescent material 938 is the same as that made of the fluorescent material 95. The dielectric material 939 is made of $Al_2O_3$, $TiO_2$, $SiO_2$, $SiN_x$, $CaF_2$, $BaSO_4$, ZnO, $B_2O_3$, $Nb_2O$, $Na_2O$ or $Li_xO_y$, and so on. The dielectric material 939 enables the light entering into the plate 93a to scatter, which is favorable to make the light evenly distribute on the light output surface 932.

During operation, the light emitted from the LED 91 passes through the corresponding light coupling portion 97, and enters into the plate 93a. A part of the light entering into plate 93a directly emits toward the recesses 933 in the light output surface 932. Another part of the light entering into plate 93*a* emits toward the dielectric material 939, changing its original direction and emitting toward the recesses 933 in the light output surface 932. The other part of the light entering into plate 93*a* emits toward the fluorescent material 938. The fluorescent material 938 is accordingly excited by the light, and emits divergent light along different directions toward the recesses 933 in the light output surface 932. The light emitting toward the recesses 933 in the light output surface 932 is refracted through the slanted sidewalls 935 of the recesses 933, and emits toward the fluorescent material 95 in the recesses 933. The fluorescent material 95 is accordingly excited by the light, and emits divergent light exiting the plate 93*a* along different directions.

Figure 11:
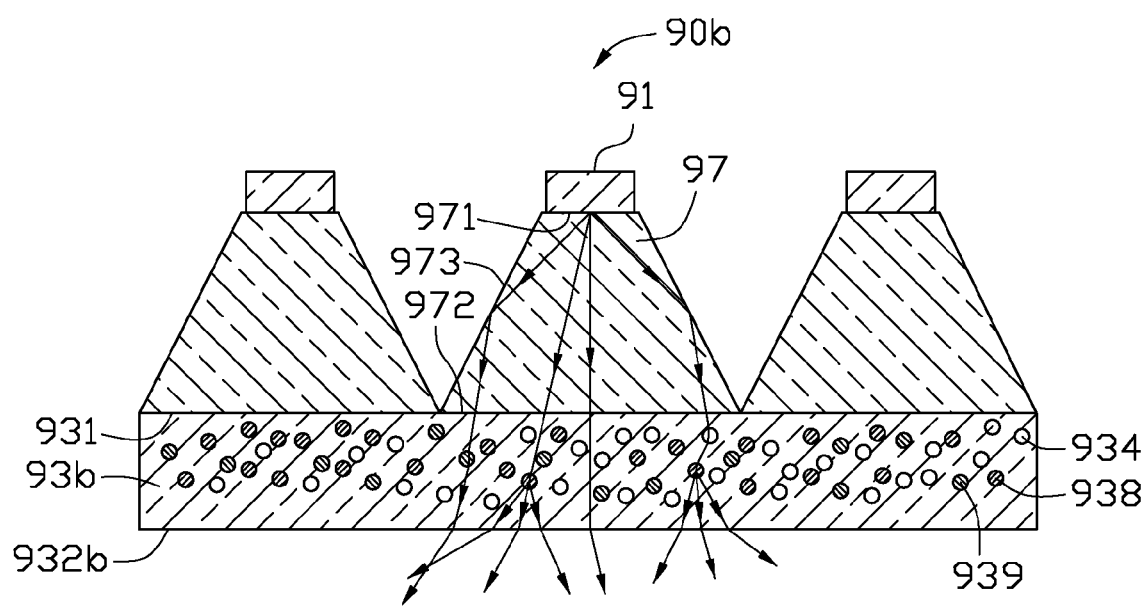
FIG. 11 is a schematic, cross-sectional view of an illuminating device in accordance with an eleventh embodiment of the present invention.

Referring to FIG. 11, an illuminating device 90*b* in accordance with an eleventh embodiment of the present invention is shown. The illuminating device 90*b* is similar to the illuminating device 90*a*. In the present embodiment, there is no recess in the light output surface 932*b* of the plate 93*b*.

During operation, the light emitted from the LED 91 passes through the corresponding light coupling portion 97, and enters into the plate 93*b*. A part of the light entering into plate 93*b* is directly refracted through the light output surface 932*b* out of the plate 93*b*. Another part of the light entering into plate 93*b* emits toward the dielectric material 939, changing its original direction, and exits the plate 93*b* through the light output surface 932*b*. The other part of the light entering into plate 93*b* emits toward the fluorescent material 938. The fluorescent material 938 is accordingly excited by the light, and emits divergent light exiting the plate 93*b* along different directions.

Alternatively, the light coupling portion 97 can be detachably engaged with the plate 93, 93*a*, 93*b*, or integrally formed with the plate 93, 93*a*, 93*b* as a single piece.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An illuminating device comprising:
    a light emitting component;
    a light guiding plate including a light incident surface and a light output surface, the light guiding plate defining a plurality of recesses in the light output surface, the recesses having a depth gradually increasing in a direction away from the light emitting component; and
    a fluorescent material distributed in an inside of the light guiding plate, the light emitting component configured for emitting first light of a first wavelength to excite the fluorescent material thereby producing second light of a second wavelength, the light emitting component and the fluorescent material being arranged in a manner that the combined first and second light emitted from the light output surface appears to be white light;
    wherein the recesses have the fluorescent material received therein.

2. The illuminating device of claim 1, wherein the second wavelength is greater than the first wavelength.

3. The illuminating device of claim 1, wherein the recesses are contiguous with each other.

4. An illuminating device comprising:
    a light emitting component;
    a light guiding plate including a light incident surface and a light output surface, the light guiding plate defining a plurality of cavities therein, the light guiding plate defining a plurality of recesses in the light output surface, the recesses having a depth gradually increasing in a direction away from the light emitting component; and
    a fluorescent material received in at least one of the cavities, the light emitting component configured for emitting first light of a first wavelength to excite the fluorescent material thereby producing second light of a second wavelength, the light emitting component and the fluorescent material being arranged in a manner that the combined first and second light emitted from the light output surface appears to be white light;
    wherein the recesses have the fluorescent material received therein.

5. The illuminating device of claim 4, wherein the second wavelength is greater than the first wavelength.

6. The illuminating device of claim 4, wherein the recesses are contiguous with each other.

7. An illuminating device comprising:
    a light emitting component;
    a light guiding plate including a light incident surface and a light output surface, the light guiding plate defining a plurality of recesses in the light output surface, the recesses having a depth gradually increasing in a direction away from the light emitting component; and
    a fluorescent material received in at least one of the recesses, the light emitting component configured for emitting first light of a first wavelength to excite the fluorescent material thereby producing second light of a second wavelength, the light emitting component and the fluorescent material being arranged in a manner that the combined first and second light emitted from the light output surface appears to be white light.

8. The illuminating device of claim 7, wherein the second wavelength is greater than the first wavelength.

9. The illuminating device of claim 7, wherein the recesses are contiguous with each other.

* * * * *